United States Patent [19]
Barefoot

[11] 3,963,393
[45] June 15, 1976

[54] ENDLESS TREAD MOLD APPARATUS

[75] Inventor: Carlton K. Barefoot, Muncie, Ind.

[73] Assignee: Tred-X Corporation, Muncie, Ind.

[22] Filed: Dec. 18, 1974

[21] Appl. No.: 533,944

[52] U.S. Cl. ................................... 425/20; 425/47; 425/215
[51] Int. Cl.² ........................ B29H 5/04; B29H 5/08
[58] Field of Search ................... 425/23, 25, 39, 42, 425/46, 38, 215, DIG. 42, 19, 47

[56] References Cited
UNITED STATES PATENTS

| | | | |
|---|---|---|---|
| 2,148,079 | 2/1939 | Martin | 425/DIG. 42 |
| 2,866,228 | 12/1958 | French | 425/25 X |
| 2,976,575 | 3/1961 | Daubenberger | 425/DIG. 42 |
| 3,042,966 | 7/1962 | Laycox | 425/23 |
| 3,159,699 | 12/1964 | Lutphin | 425/215 X |
| 3,358,330 | 12/1967 | Pacciarini et al. | 425/39 |
| 3,429,005 | 2/1969 | MacMillan | 425/38 X |
| 3,713,929 | 1/1973 | Bottasso et al. | 425/42 X |
| 3,843,291 | 10/1974 | Drab | 425/215 |

*Primary Examiner*—J. Howard Flint, Jr.
*Attorney, Agent, or Firm*—Richard D. Emch

[57] ABSTRACT

A tire tread moldin apparatus is disclosed. The apparatus, which produces an endless and seamless toroidal tire tread for use in retreading of tire carcasses, utilizes a central mandrel and a sectional retractable outer portion, defining the inner and outer sides of a mold. The mandrel and the outer mold sections are heated to cure the rubber stock as it is formed into a tire tread, and curing pressure is provided by the manner in which the outer mold sections converge upon the mandrel and by thermo-expansion.

9 Claims, 9 Drawing Figures

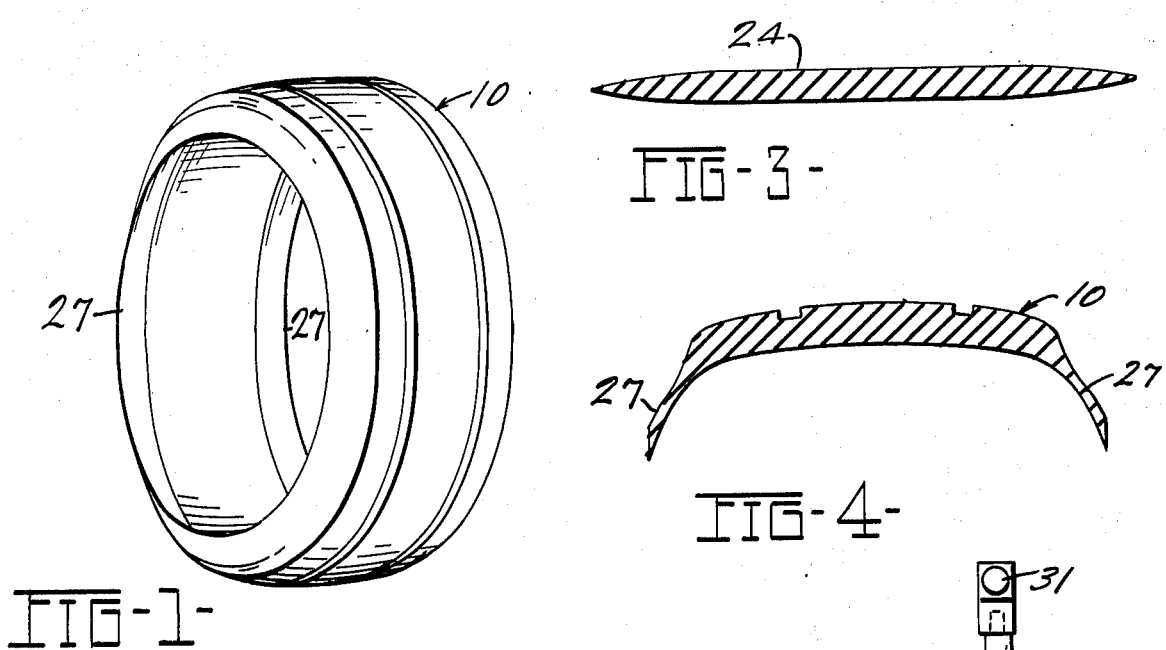
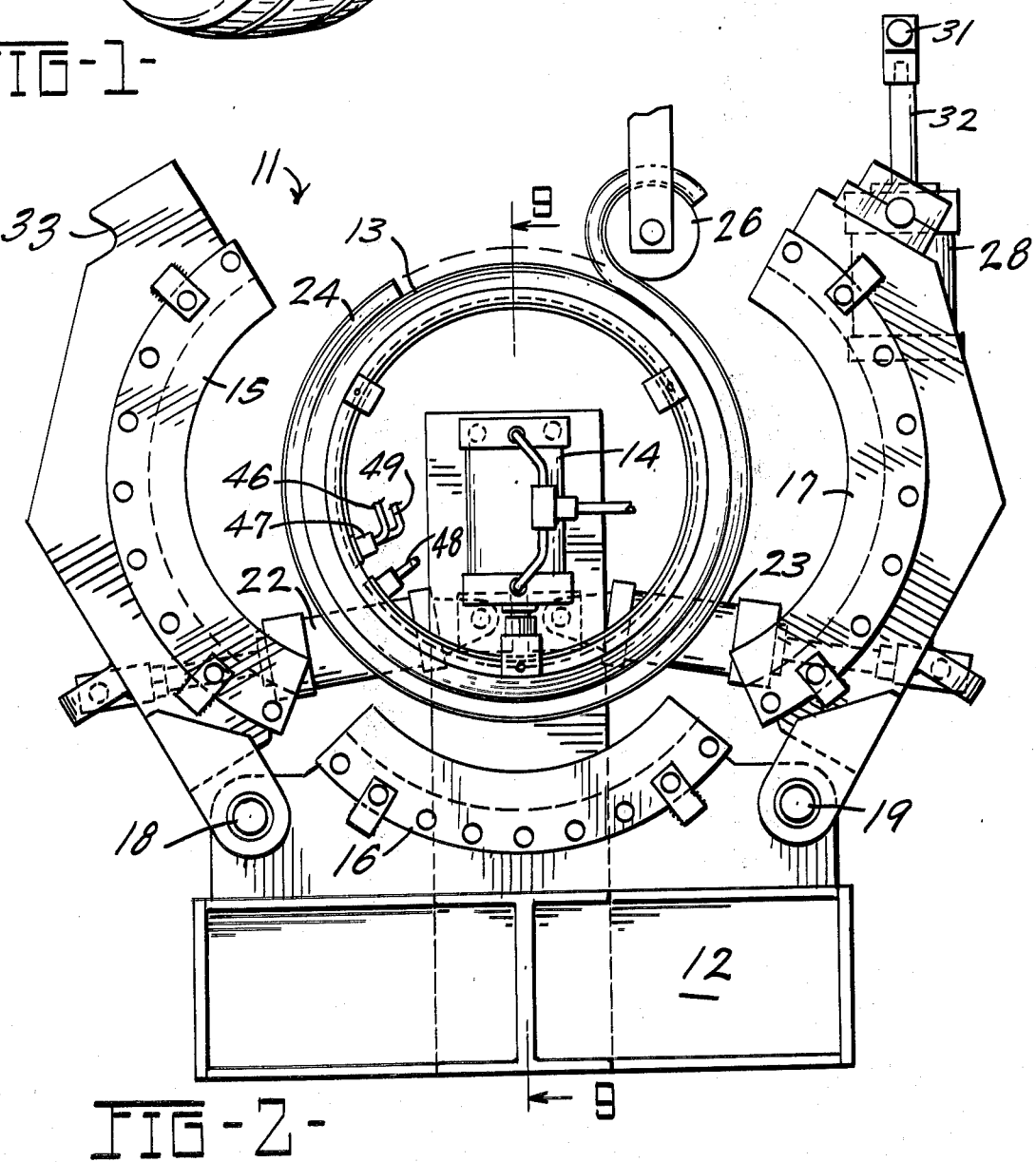

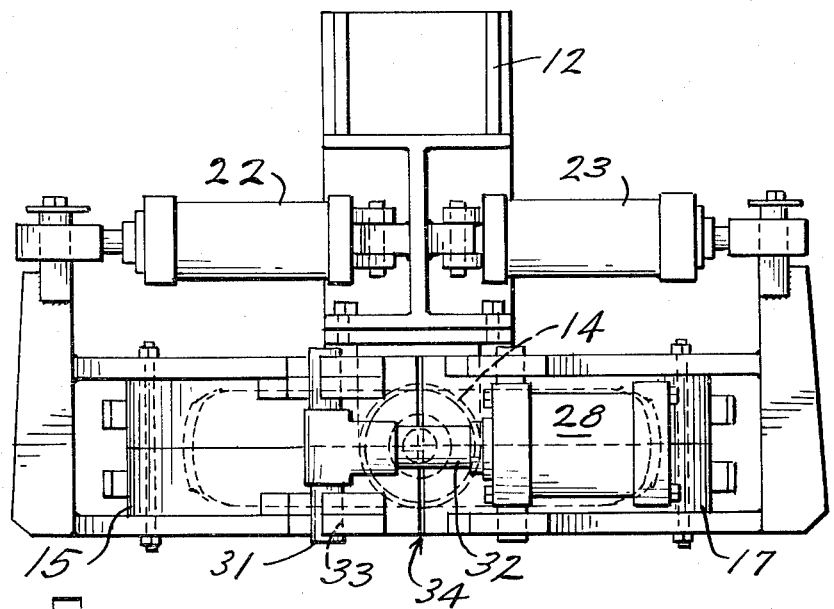
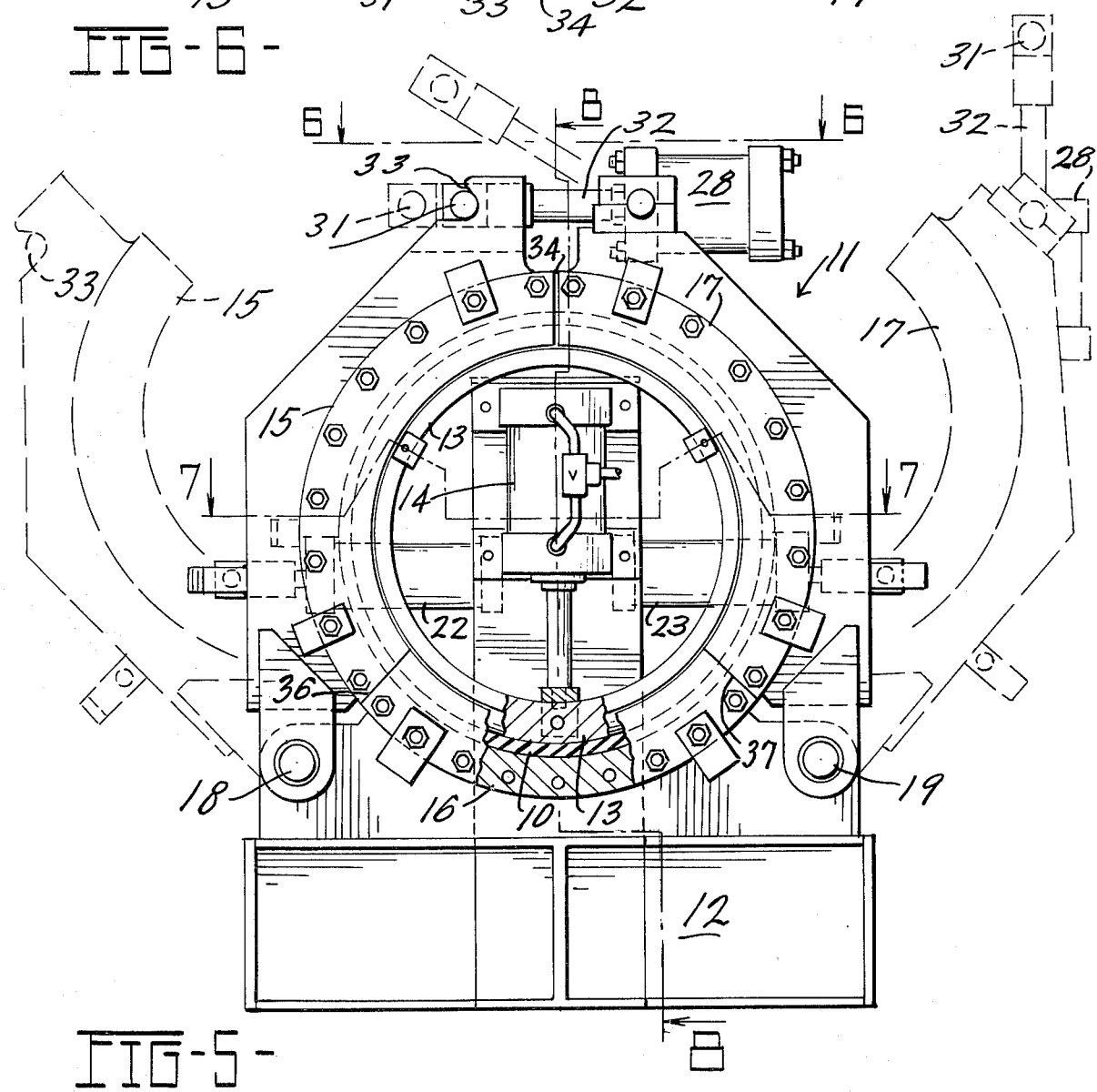

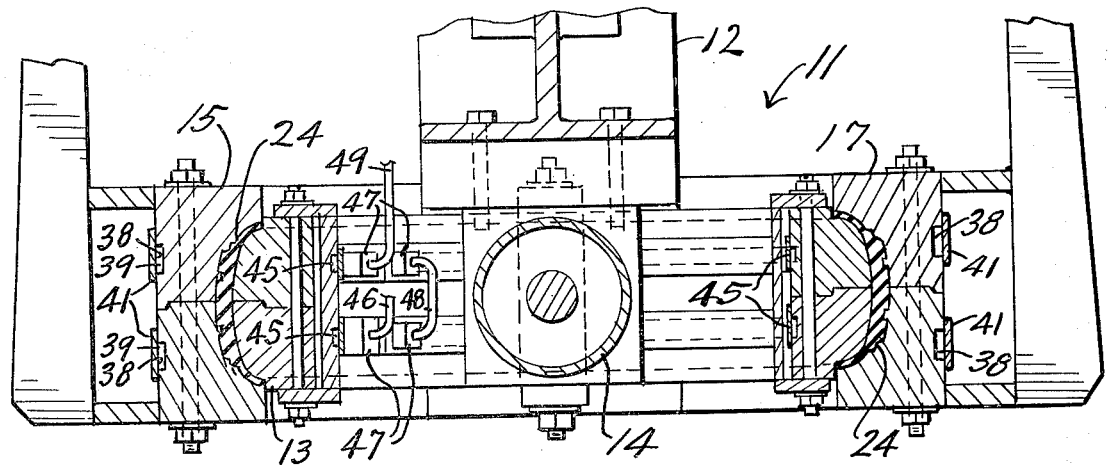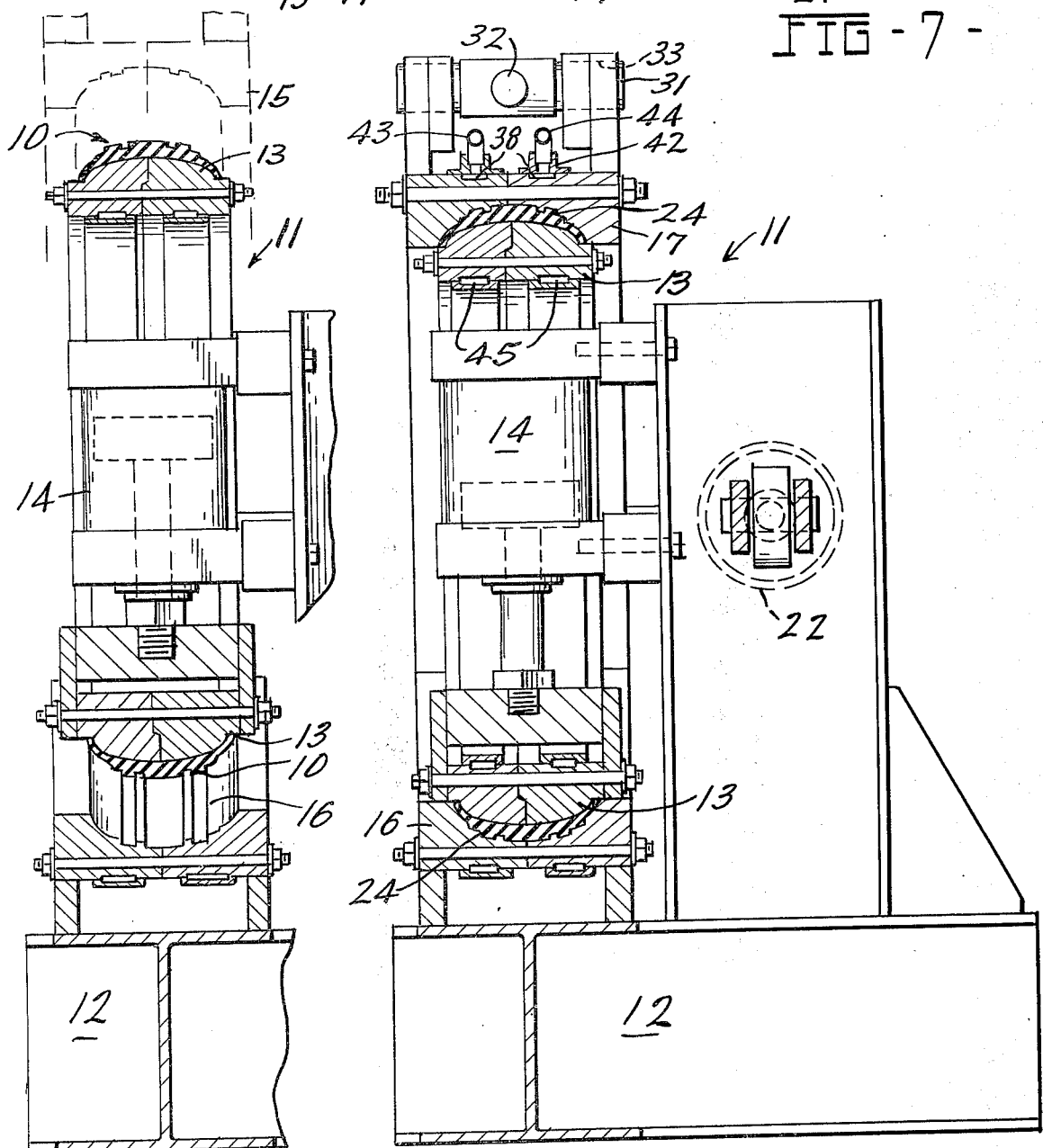

ENDLESS TREAD MOLD APPARATUS

BACKGROUND OF THE INVENTION

The invention relates to tire tread forming, and more particularly to an apparatus for molding a seamless toroidal tire tread for use in retreading of tire carcasses.

Tire retreading was at one time accomplished primarily by molding and curing of uncured rubber tread stock in situ on a tire carcass. Apparatus for this type of operation is shown in U.S. Pat. No. 3,042,966. More recently, treads for retreading tires were molded and cured separately into a linear tread strip, then assembled onto the tire carcass. This retreading practice, however, necessarily involved a seam where the two ends of the linear tread strip were joined together on the retread tire. These prior art tires are acceptable for multiple axle truck usage, but are generally not accepted for passenger cars, primarily because of their appearance and balance.

It has recently been disclosed that rebuilt tires can be produced by assembly of a seamless, preformed and cured annular tire tread onto a tire carcass. U.S. Pat. No. 3,815,651 discloses an endless precured tire tread of the type contemplated. The tread is generally moved into position on the tire carcass and bonded thereon. This construction results in a strong rebuilt tire having no transverse seam across the tread, thereby eliminating the appearance and balance problems found in most precured tread rebuilt tire structures.

SUMMARY OF THE INVENTION

The present invention provides an apparatus for efficiently molding seamless toroidal tire treads similar to those described above for use in rebuilt tire structures. The apparatus eliminates the use of an internal expanding member in conjunction with the mold.

The molding and curing apparatus of the invention includes an internal toroidal-shaped mandrel around which a strip of uncured rubber stock is wrapped. The outer portion of the mold is designed to clamp inwardly upon the mandrel and consists of three separate retractable sections which, when joined together over the mandrel, form a circular outer mold containing the tread pattern. The mold of the apparatus may be designed to form either a top cap tire tread, which is generally flat, or a tread with shoulder extending wings, such as disclosed in the above-mentioned U.S. Pat. No. 3,815,651.

Both the mandrel and the outer mold sections of the tread molding apparatus are heated, preferably by steam, for curing the rubber stock as the tread is formed. The pressure required for curing the tread is provided by the specific construction of the molding apparatus. A measured amount of rubber stock is placed over the mandrel, the amount being somewhat in excess of that required for the final endless tread. The outer mold sections are adapted to close in such a way that the required amount of pressure is exerted on the rubber by the closing force of the outer mold sections upon the mandrel. The mandrel is vertically movable, so that it is brought into a final centered position by the closing of the outer mold sections. While the outer sections are converging upon the mandrel, uncured rubber flows throughout the cavity defined around the mandrel, thoroughly filling the grooves of the tread molding areas. Excess rubber is forced to overflow through the joints defined between the adjacent outer mold sections, with the last point of closure being the primary overflow area. The flowing of the rubber toward this overflow area aids in assuring the complete filling of the mold cavity and expulsion of any trapped air therein. The specific construction of the apparatus allows the attainment of a high degree of curing pressure by means of a closing force applied at only one point around the circumference of the retractable outer mold sections.

BRIEF DESCRIPTION OF THE DRAWINGS

FIG. 1 is a perspective view of one embodiment of a seamless toroidal tire tread produced by the apparatus of the invention;

FIG. 2 is an elevational view of the tread molding apparatus of the invention, shown with the mold retracted for loading of a quantity of uncured rubber tread stock;

FIG. 3 is a sectional view of the strip of uncured rubber tread stock shown in FIG. 2;

FIG. 4 is a sectional view of the completed tire tread shown in FIG. 1;

FIG. 5 is an elevational view of the tread molding apparatus of the invention, shown in closed molding position;

FIG. 6 is a plan view of the tread molding apparatus in the closed position, taken along the line 6—6 of FIG. 5;

FIG. 7 is a sectional view taken along the line 7—7 of FIG. 5;

FIG. 8 is a sectional view taken along the line 8—8 of FIG. 5; and

FIG. 9 is a sectional view of the apparatus in open position, taken along the line 9—9 of FIG. 1.

DESCRIPTION OF THE PREFERRED EMBODIMENT

In the drawings, FIGS. 1 and 4 show an endless, seamless tire tread 10 for use in retreading or rebuilding tire carcasses. The tread 10 is produced on a tread molding apparatus shown in FIG. 2 and generally indicated by the reference number 11. The apparatus 11 includes a base 12, a generally toroidal rigid mandrel 13 which acts as the inner side of the mold and is vertically reciprocable by a hydraulic cylinder 14 connected to the base 12, and three arcuate outer mold sections 15, 16 and 17 containing the tread pattern and cooperating with inner mandrel 13. The bottom mold section 16 is affixed to the base 12, while the remaining mold sections 15 and 17 are connected to the base 12 by pivotal connections 18 and 19. The pivoted mold sections 15 and 17 are movable inwardly toward their closed position with the bottom mold section 16 circumjacent the mandrel 13. Inward and outward movement is accomplished by cylinders 22 and 23 which are provided to the base 12 and to the respective mold sections 15 and 17.

In FIG. 2 the molding apparatus 11 is shown in the open position with the outer mold sections 15 and 17 retracted from the mandrel 13. The mandrel 13 is in its uppermost position, and the movable outer mold sections 15 and 17 are pivoted outwardly. In this position, a strip of uncured tire tread stock 24 is placed around the circumference of the mandrel 13. This may be accomplished by unrolling the rubber strip 24 from a spool 26 as shown in FIG. 2. The uncured rubber strip 24 is premeasured for quantity and preshaped as shown in the cross-sectional view of FIG. 3 to aid in molding the tread shown in section in FIG. 4, which in this embodiment includes shoulder extending wings 27.

FIGS. 5 and 6 show the tire tread molding apparatus 11 in the closed molding position. As these figures and FIG. 2 indicate, the cylinders 22 and 23 have drawn the pivoted outer mold sections 15 and 17 together into the closed position while the cylinder 14 has lowered the central mandrel 13 into a closed position relative to the bottom mold section 16. An additional closing or clamping cylinder 28, pivotally connected to the top of the mold section 17, is provided to engage the opposite mold section 15 when the two sections are nearly closed, and draw the sections together about the mandrel 13 with substantial force. This force is needed to displace the uncured rubber into the shape of the mold cavity as the mold sections come together. A latch bar 31 connected to the rod 32 of the cylinder 28 is adapted to engage a corresponding pair of recesses 33 on the mold section 15 for this purpose.

In the curing of the tire tread rubber, the rubber must be maintained under a substantial pressure in order to properly vulcanize it to the desired density. In the molding apparatus 11, the clamping force exerted by the closing hydraulic cylinder 28, together with the mechanical advantage of the pivotal connections 18 and 19, provides the required curing pressure on the enclosed tread strip 24. The drawn-together pivoted sections 15 and 17 do not make abutting contact with one another but rather define a small gap cavity 34 under the full drawing force of the closing cylinder 28. A substantially even pressure is thus exerted around the periphery of the mandrel 13. The vertically reciprocable mandrel 13 is forced downward slightly in a camming action by the closure of the pivoted mold sections 15 and 17. This increases the pressure against the lower mold section 16.

The quantity of rubber in the mold is in excess of the total required for the tire tread. Since the tight cooperation between the outer mold sections and the mandrel (see the cross-sectional views of FIGS. 7, 8 and 9) affords no escape for the displaced flowing rubber other than the gap cavity 34 and to a lesser extent at joints 36 and 37 located between the bottom mold section 16 and the sections 15 and 17, the flowing rubber is placed under pressure by the final closing force of the hydraulic cylinder 28. After the first stages of closure, the joints 36 and 37 become substantially sealed and the gap cavity 34 at the top of the mold is the last point of closure through which the final quantities of excess rubber must flow. The apparatus 11 is capable of producing high molding pressures.

The rubber strip 24 is heated as well as placed under pressure during its molding and curing into a tire tread 10. Heating may be accomplished by several means, including steam and electrical heating. The heating in the present embodiment is accomplished by passing steam through the mold sections 15, 16 and 17 and through the mandrel 13 while clamping pressure is being exerted by the hydraulic cylinder 28. Steam passages through the mold sections are shown in FIGS. 7, 8 and 9. As indicated therein, steam passages 38 for the outer mold sections 15, 16 and 17 preferably comprise channels 39 defined in the outer surfaces of the arcuate sections with plates 41 welded over the channels 39 to form the closed passageways. The steam passages 38 are, of course, not continuous from one outer mold section to the next; stem blocks 42 are located at the ends of the passages 38 in each mold section 15, 16 and 17. A pair of steam blocks 42 having inlet and outlet steam tubes 43 and 44 connected thereto are shown on the mold section 17 in FIG. 8. At the other end of the section 17, a crossover steam tube (not shown) connects a pair of steam blocks in the same passages 38, so that a steam flow path is defined from the inlet tube 43 to the outlet tube 44. The steam passages and blocks of the other mold sections 15 and 16 are connected similarly. The mandrel 13 is heated by steam passages 45 around its inner periphery similar to those of the outer mold sections except that the steam passages 45 extend nearly continuously around the internal periphery of the mandrel 13. An inlet tube 46 admits steam through a steam block 47 to the first passage 45, from which the steam travels clockwise around the mandrel 13, through a crossover tube 48, through the second steam passage 45 counterclockwise around the mandrel and out an outlet conduit 49. The mold sections and the mandrel are normally heated to a vulcanizing temperature of between 300°–325°F.

As noted above, as an alternative to steam heating, electrical resistance heating may be used to bring the molds to curing temperature.

After the rubber stock 24 has been shaped and cured in the mold, the mold sections are opened. First, the two pivoted sections 15 and 17 are opened by releasing and unlatching the closing cylinder 28 and extending the cylinders 22 and 23 to pivot the mold sections 15 and 17 into their full open positions. The molded tire tread remains on the mandrel 13, which is then moved by the cylinder 14 into its uppermost position, away from the fixed bottom mold section 16. This position of the apparatus 11 is shown in the sectional view of FIG. 9, and also in the elevational view of FIG. 2, except that in FIG. 2 the uncured rubber stock 24 is shown on the mandrel 13 rather than the completed tire tread 10.

The flexible tire tread 10 may be removed from the molding mandrel 13 manually and the molding apparatus 11 is ready for reloading of another strip of uncured rubber stock. With manual loading and unloading of the apparatus 11, a molding and curing cycle normally requires about six to ten minutes.

The above-described preferred embodiment provides an endless, seamless tire tread molding apparatus which is fast and efficient in operation. The rubber stock 24 is placed under compression upon closing of the mold sections 15 and 17 and by heating. Thermoexpansion of the ruber stock 24 in a confined space greatly increases the curing pressures. The need for an internal pressure bag or any other form of internal pressurizing means is eliminated. Various other embodiments and alterations to this preferred embodiment will be apparent to those skilled in the art and may be made without departing from the spirit and scope of the following claims.

What I claim is:

1. An apparatus for molding and curing an endless, seamless annular tire tread from a mold rubber for use in retreading of tire carcasses, comprising:
   a base;
   a solid center mandrel having a generally cylindrical outer surface, said mandrel forming the inside surface of a mold cavity;
   a plurality of arcuate outer mold sections connected to said base and containing a tread pattern, said mold sections when together forming a circular outer mold adapted to cooperate with said center mandrel;

means connected to said base and said outer mold sections for closing said outer mold sections inwardly about said center mandrel to a closed curing position, adjacent ones of said mold sections defining at least one gap cavity when in such curing position, whereby said closing to such curing position substantially seals the resulting mold cavity from leakage of mold rubber except at all such gap cavities defined between said outer mold sections, said gap cavity forming an overflow for excess mold rubber, said closing means including means for applying a clamping force urging the outer mold sections into tight engagement circumjacent the center mandrel to apply pressure to the enclosed mold rubber; and means for heating the mold rubber to a curing temperature, whereby thermo-expansion increases the curing pressures.

2. The apparatus of claim 1 wherein said outer mold sections include a first mold section connected to said base and a pair of opposed mold sections on either side of said first mold section each pivotally connected at one end to said base, and said means for closing said outer mold sections about said center mandrel includes means for linearly translating said center mandrel with respect to said first mold section from a position spaced from said first mold section to a position adjacent said first mold section, and means for pivotally moving said pair of opposed outer mold sections inwardly adjacent said first mold section and circumjacent said center mandrel.

3. The apparatus of claim 2 wherein said means for applying a clamping force comprises means connected to the non-pivoted end of one of said opposed mold sections for engaging the corresponding end of said other mold section for forcing said two ends together, thereby urging said inner mandrel toward and into closer engagement with said first mold section.

4. The apparatus of claim 3, wherein said means for linearly translating the mandrel comprises a cylinder operatively connected between said center mandrel and said base.

5. The apparatus of claim 3, wherein said moving means comprises a pair of cylinders, one of said cylinders being operatively connected between said base and one of said opposed outer mold sections and the other of said cylinders being operatively connected between said base and the other one of said opposed outer mold sections.

6. The apparatus of claim 3, wherein said clamping force means comprises a clamping cylinder mounted adjacent the non-pivoted end of one of said opposed mold sections, said cylinder including means for engaging the non-pivoted end of said other mold section.

7. The apparatus of claim 6, wherein said clamping cylinder includes a rod and wherein said engaging means comprises a bar on said rod, said other mold section defining a bar receiving recess adjacent said non-pivoted end, said bar and said recess being complementary.

8. An apparatus for molding and curing endless, seamless annular tire treads from uncured tread stock for use in retreading tire carcasses, comprising: a base; a mold connected to said base, said mold defining an annular mold cavity formed by a solid inner mandrel having a generally cylindrical outer surface for receiving a quantity of uncured tread stock and for forming the inside surface of the tread and an outer tread mold containing the tread pattern circumjacent said mandrel, said outer mold being divided into a plurality of arcuate sections; said outer mold sections defining at least one overflow gap between adjacent ones of said outer mold sections; means for heating said mold; means for moving said outer mold sections away from and toward said mandrel; and means for clamping said outer mold sections upon said mandrel and the uncured tread stock such that when nearly fully closed, such mold cavity is substantially sealed against leakage of tread stock therefrom except at all of said at least one overflow gap through which excess tread stock overflows as said outer mold sections are drawn tightly adjacent the mandrel and heated, whereby the tread stock is placed under vulcanizing pressure.

9. A molding apparatus according to claim 8, wherein said outer mold is divided into three arcuate sections, a first one of which is affixed to said base, the others of which comprise a pair of similar and opposite outer mold sections pivotally connected to the base on either side of said first section and adapted to pivotally converge inwardly toward one another circumjacent said mandrel, said mandrel being linearly translatable with respect to the base and said first mold section, whereby said mold may be opened by pivoting said other outer mold sections outwardly, then translating said mandrel away from said first mold section.

* * * * *